(12) United States Patent
Mori (10) Patent No.: US 6,222,346 B1
(45) Date of Patent: Apr. 24, 2001

(54) BATTERY PROTECTION DEVICE (75) Inventor: Iichiro Mori, Itami (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/635,054

(22) Filed: Aug. 9, 2000

(30) Foreign Application Priority Data

Aug. 18, 1999 (JP) .................................. 11-231660
Aug. 18, 1999 (JP) .................................. 11-231661

(51) Int. Cl.[7] .................................................. H02J 7/00
(52) U.S. Cl. ................................... 320/134; 320/164
(58) Field of Search ..................................... 320/134, 162, 320/163, 164; 324/430

(56) References Cited

U.S. PATENT DOCUMENTS

| 5,304,915 | 4/1994 | Sanpei et al. | |
|---|---|---|---|
| 5,493,197 | * 2/1996 | Eguchi et al. | 320/116 |
| 5,610,495 | * 3/1997 | Yee et al. | 320/116 |
| 6,150,797 | * 11/2000 | Mukainakano | 320/134 |
| 6,157,171 | * 12/2000 | Smith | 320/133 |

FOREIGN PATENT DOCUMENTS

| 04033271A | 2/1992 | (JP) . |
|---|---|---|
| 04075430A | 3/1992 | (JP) . |

* cited by examiner

Primary Examiner—Edward H. Tso
Assistant Examiner—Gregory J. Toatley, Jr.
(74) Attorney, Agent, or Firm—Jordan and Hamburg LLP (57) ABSTRACT A control circuit detects the battery voltage $E_1$ of the rechargeable battery, and the terminal voltage $E_2$ across the input/output terminals that are connected to the rechargeable battery through a charge/discharge circuit. When the battery voltage $E_1$ is lower than a charge-prohibiting voltage and higher than a discharge-prohibiting voltage, the control circuit turns on the first and second FETS, which are connected in series to the charge/discharge circuit. When the battery voltage $E_1$ is higher than the charge-prohibiting voltage, the first FET is turned off, and when the battery voltage is higher than the terminal voltage, the first FET is turned on. When the battery voltage $E_1$ is lower than the discharge-prohibiting voltage, the second FET is turned off, and when the battery voltage $E_1$ is higher than the terminal voltage $E_2$, the second FET is turned on.

7 Claims, 5 Drawing Sheets

BATTERY PROTECTION DEVICE

BACKGROUND OF THE INVENTION

1. Field of the Invention

The present invention relates to a battery protection device for protecting a rechargeable battery, such as a lithium-ion rechargeable battery, from overcharging and overdischarging.

2. Description of the Related Art

Charging or discharging of rechargeable batteries beyond their suitable charge or discharge conditions may cause breakdown or deterioration of the battery. In particular, lithium-based rechargeable batteries tend to fail due to generation of gas and temperature increase when the electrolyte dissolves because of continuing overcharging. There is thus a need for a charge control, which makes sure that the rechargeable battery is not subjected to overcharging. It is therefore the normal practice to provide a battery protection device and to control charging and discharging of the rechargeable battery through the battery protection device, wherein the charge/discharge circuit is interrupted when overcharge or over-discharge is detected.

Figure 6:
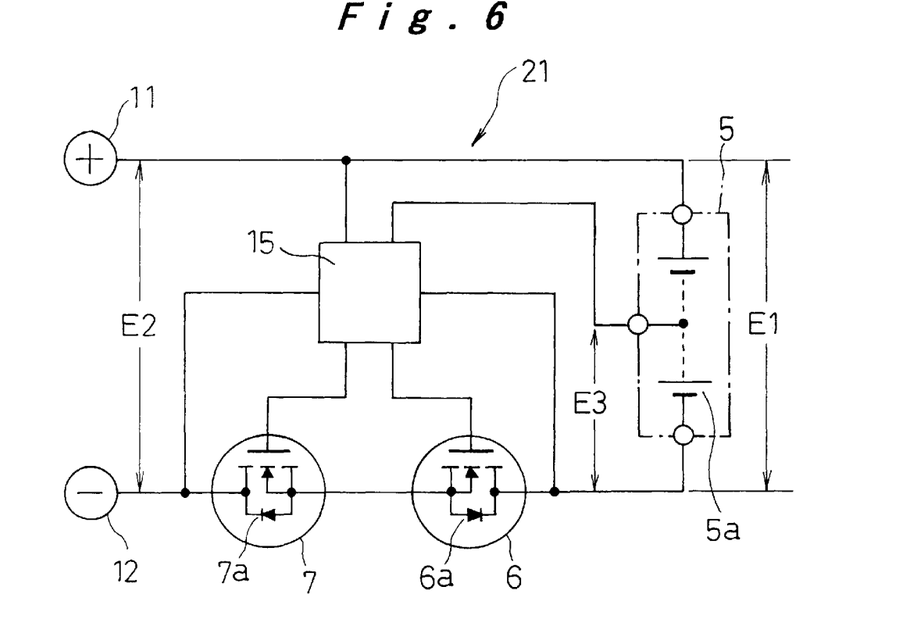
FIG. 6 is a circuit diagram showing the configuration of a battery protection device in accordance with a fifth embodiment of the present invention.

FIG. 6 shows the configuration of a protective device for a rechargeable battery as disclosed in Japanese Patent No. 2872365. A first switching element 31 and a second switching element 32 are connected in series in a charge/discharge circuit that connects a rechargeable battery 30 with input/output terminals 34 and 35. A control means 33 switches the first and the second switching element 31 and 32 between a conducting state and an interrupting state. The control means 33 detects the voltage of the rechargeable battery 30, in accordance with which it turns the first switching element 31 into the conducting state when the battery voltage is below a charge-prohibiting voltage, that is indicative of a voltage beyond which the battery will be overcharged, and turns the second switching element 32 into the conducting state when the battery voltage is above a discharge-prohibiting voltage, that is indicative of a voltage below which the battery will be over-discharged. In other words, when the rechargeable battery 30 complies with suitable charge/discharge conditions, the first and the second switching elements 31 and 32 are conducting, and the charge/discharge circuit for the rechargeable battery 30 establishes a conducting connection to the input/output terminals 34 and 35.

When the battery voltage is above the charge-prohibiting voltage, the charge/discharge circuit is interrupted, because the control means 33 turns the first switching element 31 into the interrupting state, and the charging is stopped, so that the rechargeable battery 30 is prevented from becoming overcharged. Conversely, when the battery voltage is below the discharge-prohibiting voltage, the charge/discharge circuit is interrupted, because the control means 33 turns the second switching element 32 into the interrupting state, and the discharging is stopped, so that the rechargeable battery 30 is prevented from becoming over-discharged.

As shown in FIG. 6, the first and second switching elements 31 and 32 both have parasitic diodes 31a and 32a between source and drain. The first and second switching elements 31 and 32 are connected in a manner that the forward direction of the parasitic diode 31a of the first switching element 31 corresponds to the discharge direction of the rechargeable battery 30, and the forward direction of the parasitic diode 32a of the second switching element 32 corresponds to the charge direction of the rechargeable battery 30.

Thus, when the control means 33 turns the first switching element 31 into the interrupting state to prevent overcharging, a discharging circuit is formed through the parasitic diode 31a, so that the rechargeable battery 30 can be discharged through the parasitic diode 31a, and when discharging has caused the battery voltage to drop below a charge-permitting voltage that is lower than the charge-prohibiting voltage, the control means 33 turns the first switching element 31 into the conducting state, and returns to a discharge state, in which the parasitic diode 31a cannot be passed. Conversely, when the control means 33 turns the second switching element 32 into the interrupting state to prevent over-discharging, a charging circuit is formed through the parasitic diode 32a, so that the rechargeable battery 30 can be charged through the parasitic diode 32a, and when charging has caused the battery voltage to rise above a discharge-permitting voltage that is higher than the discharge-prohibiting voltage, the control means 33 turns the second switching element 32 into the conducting state, and returns to a charge state, in which the parasitic diode 32a cannot be passed.

By using the parasitic diodes 31a and 32a of the first and second switching elements 31 and 32 in this fashion, discharging is possible when charging is prohibited, and charging is possible when discharging is prohibited, so that the rechargeable battery 30 can still be used when the circuit is interrupted to prevent overcharging and over-discharging of the rechargeable battery 30.

However, in this conventional configuration, there is the problem that during the time until a voltage is reached at which the charge-prohibiting state or the discharge-prohibiting state is cancelled, discharging or charging is carried out through the parasitic diodes 31a, 32a, whereby, when a large current flows through the parasitic diodes 31a, 32a, heat is generated in the first switching element 31 or the second switching element 32, which may lead to their deterioration. That is, the power loss when a certain current flows through the parasitic diodes 31a, 32a in forward direction is several times higher than the power loss when the same current flows between drain and source in the power MOSFETs used for the first and the second switching elements. Even though the heat generated by the current flowing between drain and source does not cause a failure of the power MOSFETs, the same current may lead to thermal destruction and failure of the power MOSFETs when flowing through the parasitic diodes.

In the case where a plurality of cells are connected in series to constitute the rechargeable battery 30, it is not sufficient to detect only the battery voltage. That is, if there are variations in the battery capacity between various cells, those that have lower battery capacity may fall into a state of over-discharge. In an extreme case, some cells that have lower battery capacity may discharge until their battery capacity is zero, they will be charged by other cells, leading to rapid deterioration of the cells. Therefore, when the rechargeable battery is constituted by connecting a plurality of cells in series, control for preventing over-discharge must be effected in consideration of the overall balance of the battery capacity of various cells.

SUMMARY OF THE INVENTION

In view of the foregoing, it is an object of the present invention to provide a battery protection device that allows discharging when charging is prohibited and charging when discharging is prohibited, while ensuring that no large discharge current or charge current flows through the parasitic diodes of the switching elements.

To attain this and other objects, a battery protection device according to a first aspect of the present invention includes:

a first switching means and a second switching means connected in series in a charge/discharge circuit connecting a positive electrode of a rechargeable battery to a positive input/output terminal and a negative electrode of the rechargeable battery to a negative input/output terminal; and a control means for detecting (i) a battery voltage between the positive electrode and the negative electrode of the rechargeable battery and (ii) a terminal voltage between the positive input/output terminal and the negative input/output terminal;

turning on the first switching means when the battery voltage is below a charge-prohibiting voltage at which charging the rechargeable battery is stopped, and turning on the second switching means when the battery voltage is above a discharge-prohibiting voltage at which discharging the rechargeable battery is stopped;

turning off and keeping off the first switching means when the battery voltage rises above the charge-prohibiting voltage, and turning on the first switching means when the terminal voltage becomes lower than the battery voltage; and turning off and keeping off the second switching means when the battery voltage drops below the discharge-prohibiting voltage, and turning on the second switching means when the terminal voltage becomes higher than the battery voltage.

In accordance with this first aspect of the present invention, the control means turns on the first and the second switching means when the battery voltage is within a suitable range of charge/discharge conditions below a charge-prohibiting voltage and above a discharge-prohibiting voltage, so that the rechargeable battery can be charged and discharged when connected to the input/output terminals. When the battery voltage is above the charge-prohibiting voltage, the control means turns the first switching means off to stop charging of the rechargeable battery, but when a discharge state is detected, in which the terminal voltage is lower than the battery voltage, the control means turns the first switching means on to allow discharging of the rechargeable battery. Conversely, when the battery voltage is below the discharge-prohibiting voltage, the control means turns the second switching means off to stop discharging of the rechargeable battery, but when a charge state is detected in which the terminal voltage is higher than the battery voltage, the control means turns the second switching means on to allow charging of the rechargeable battery.

When power MOSFETs are used for the first and the second switching means, they incorporate parasitic diodes whose forward direction is opposite to the drain-source direction of the power MOSFETs. In the prior art, as described in the foregoing, in order to discharge the rechargeable battery while the charging is prohibited, the rechargeable battery is discharged through the parasitic diode of the first switching means, whereas in order to charge the rechargeable battery while the discharging is prohibited, the rechargeable battery is charged through the parasitic diode of the second switching means. However, the switching means generate heat when large charge or discharge currents flow through the parasitic diodes, which brings about the problem of deterioration. With the configuration of the present invention, no charge or discharge current flows through the parasitic diodes, and therefore, the present invention solves the problem of the conventional configuration and provides a battery protection device with high reliability and durability.

To attain the aforementioned objects, a battery protection device according to a second aspect of the present invention includes:

a first switching means and a second switching means connected in series in a charge/discharge circuit connecting a positive electrode of a rechargeable battery to a positive input/output terminal and a negative electrode of the rechargeable battery to a negative input/output terminal; and a control means for detecting (i) a battery voltage between the positive electrode and the negative electrode of the rechargeable battery and (ii) a current direction in the charge/discharge circuit;

turning on the first switching means when the battery voltage is below a charge-prohibiting voltage at which charging the rechargeable battery is stopped, and turning on the second switching means when the battery voltage is above a discharge-prohibiting voltage at which discharging the rechargeable battery is stopped;

turning off and keeping off the first switching means when the battery voltage rises above the charge-prohibiting voltage, and turning on the first switching means when the current direction has changed into a discharge direction; and turning off and keeping off the second switching means when the battery voltage drops below the discharge-prohibiting voltage, and turning on the second switching means when the current direction has changed into a charge direction.

In accordance with this second aspect of the present invention, the control means turns on the first and the second switching means when the battery voltage is within a suitable range of charge/discharge conditions below a charge-prohibiting voltage and above a discharge-prohibiting voltage, so that the rechargeable battery can be charged and discharged when connected to the input/output terminals. When the battery voltage is above the charge-prohibiting voltage, the control means turns the first switching means off to stop charging of the rechargeable battery, but when it is detected that the current direction is that of a discharge current, the control means turns the first switching means on to allow discharging of the rechargeable battery. Conversely, when the battery voltage is below the discharge-prohibiting voltage, the control means turns the second switching means off to stop discharging of the rechargeable battery, but when it is detected that the current direction is that of a charge current, the control means turns the second switching means on to allow charging of the rechargeable battery.

Consequently, while power MOSFETs are used for the first and second switching means, no charge or discharge current will flow through their internal parasitic diodes, and there is no heat generation in the power MOSFETs due to high charge and discharge currents through the parasitic diodes and the deterioration it entailed, which used to be a problem in the prior art, so that a battery protection device with high reliability and durability can be provided.

In the configuration according to the second aspect of the present invention, the current direction can be detected from the voltages across the first and/or the second switching means. That is, the current direction can be detected, because the direction of the voltage drop across the small ON resistance of the first and/or the second switching means differs between charge direction and discharge direction.

Alternatively, the current direction can be detected from the voltage across a resistor connected in series with the charge/discharge circuit. That is, the current direction can be detected, because the direction of the voltage drop across the resistor differs between charge direction and discharge direction.

To attain the aforementioned objects, a battery protection device according to a third aspect of the present invention includes:

a first switching means and a second switching means connected in series in a charge/discharge circuit connecting a positive electrode of a rechargeable battery to a positive input/output terminal and a negative electrode of the rechargeable battery to a negative input/output terminal; and a control means for
detecting (i) a battery voltage between the positive electrode and the negative electrode of the rechargeable battery and (ii) a terminal voltage between the positive input/output terminal and the negative input/output terminal;
turning on the first and the second switching means when the battery voltage is below a charge-prohibiting voltage at which charging the rechargeable battery is stopped and above a discharge-prohibiting voltage at which discharging the rechargeable battery is stopped;
turning off and keeping off the first and the second switching means when the battery voltage rises above the charge-prohibiting voltage and the terminal voltage is higher than the battery voltage, and turning on the first and the second switching means when the terminal voltage becomes lower than the battery voltage; and
turning off and keeping off the first and the second switching means when the battery voltage drops below the discharge-prohibiting voltage and the terminal voltage is lower than the battery voltage, and turning on the first and the second switching means when the terminal voltage becomes higher than the battery voltage.

In accordance with the third aspect of the present invention, the control means turns the first and the second switching means on or off with one control signal at the same time, depending on the battery voltage and the terminal voltage. When the battery voltage is lower than the charge-prohibiting voltage and higher than the discharge-prohibiting voltage, the first and the second switching means can be turned on for charging or discharging, regardless of the difference between the terminal voltage and the battery voltage. When the battery voltage is higher than the charge-prohibiting voltage and the terminal voltage is higher than the battery voltage, the first and the second switching means are turned off to stop charging, but when the battery voltage is higher than the charge-prohibiting voltage and the terminal voltage is lower than the battery voltage, the first and the second switching means are turned on to allow discharging. When the battery voltage is lower than the discharge-prohibiting voltage and the terminal voltage is lower than the battery voltage, the first and the second switching means are turned off to stop discharging, but when the battery voltage is lower than the charge-prohibiting voltage and the terminal voltage is higher than the battery voltage, the first and the second switching means are turned on to allow charging.

Consequently, while suitable power MOSFETs are used for the first and second switching means, there is no discharge current flowing through their internal parasitic diodes when discharging is carried out while charging is prohibited and no charge current flowing through their internal parasitic diodes when charging is carried out while discharging is prohibited, and there is no heat generation in the power MOSFETs due to high charge and discharge currents through the parasitic diodes and the deterioration it entailed, which used to be a problem in the prior art, so that a battery protection device with high reliability and durability can be provided.

To attain the aforementioned objects, a battery protection device according to a fourth aspect of the present invention includes:

a first switching means and a second switching means connected in series in a charge/discharge circuit for connecting a positive electrode of the rechargeable battery comprising a plurality of cells connected in series, to a positive input/output terminal and a negative electrode of the rechargeable battery to a negative input/output terminal; and a control means for
detecting (i) a battery voltage between the positive electrode and the negative electrode of the rechargeable battery, (ii) module voltages of battery modules into which the plurality of cells constituting the rechargeable battery are divided in equal numbers, and (iii) a terminal voltage between the positive input/output terminal and the negative input/output terminal;
turning on the first switching means when the battery voltage is below a charge-prohibiting voltage above which charging of the rechargeable battery must be prohibited, and turning on the second switching means when the difference between the module voltages is below a certain voltage difference;
turning off the first switching means when the battery voltage is higher than the charge-prohibiting voltage and the terminal voltage is higher than the battery voltage, and turning on the first switching means when the battery voltage is higher than the charge-prohibiting voltage and the terminal voltage is lower than the battery voltage; and
turning off the second switching means when the terminal voltage is lower than the battery voltage and the difference between the module voltages is above a certain voltage difference, and turning on the second switching means when the terminal voltage is higher than the battery voltage and the difference between the module voltages is above a certain voltage difference.

In accordance with this fourth aspect of the present invention, the control means turns on the first switching means when the battery voltage is within a suitable range of charge/discharge conditions below a charge-prohibiting voltage, so that the rechargeable battery can be charged when connected to the input/output terminals. When the battery voltage is above the charge-prohibiting voltage, the control means turns the first switching means off to stop charging of the rechargeable battery, but when a discharge state is detected, in which the terminal voltage is lower than the battery voltage, the control means turns the first switching means on to allow discharging of the rechargeable battery. Accordingly, even when the rechargeable battery is discharged under the control for preventing further charging, no large discharge current flows through the parasitic diode in the first switching means, because the first switching means has been turned on, whereby heat generation and resultant deterioration of the first switching means are prevented.

The control means turns on the second switching means when the voltage difference between a plurality of battery modules is below a predetermined value, so that the rechargeable battery can be discharged when connected to the input/output terminals. When the module voltage difference is above a predetermined discharge-prohibiting voltage difference, the control means turns the second switching means off to stop discharging of the rechargeable battery, because there is the possibility that some cells may be in a state of over-discharge. With this control, even when there are variations in the battery capacity between various cells connected in series that constitute the rechargeable battery, it is prevented that some cells fall into a state of over-discharge, whereby the battery performance of the rechargeable battery is prevented from deteriorating. During this control of prohibiting further discharge, when a charging state is detected by a comparison between the terminal voltage and the battery voltage, the control means turns the second switching means on to allow charging of the rechargeable battery.

To attain the aforementioned objects, a battery protection device according to a fifth aspect of the present invention includes:

a first switching means and a second switching means connected in series in a charge/discharge circuit for connecting a positive electrode of the rechargeable battery comprising a plurality of cells are connected in series, to a positive input/output terminal and a negative electrode of the rechargeable battery to a negative input/output terminal;

a temperature detection means for detecting the temperature of the rechargeable battery; and a control means for detecting (i) a battery voltage between the positive electrode and the negative electrode of the rechargeable battery, (ii) module voltages of battery modules into which the plurality of cells constituting the rechargeable battery are divided in equal numbers, and (iii) a terminal voltage between the positive input/output terminal and the negative input/output terminal;

turning on the first switching means when the battery voltage is below a charge-prohibiting voltage above which charging of the rechargeable battery must be prohibited and the terminal voltage is higher than the battery voltage, turning off the first switching means when the battery voltage is higher than the charge-prohibiting voltage and the terminal voltage is higher than the battery voltage, and turning on the first switching means when the terminal voltage is lower than the battery voltage;

turning on the second switching means when a difference between the module voltages is below a discharge-prohibiting voltage difference at which discharging the rechargeable battery is stopped and the terminal voltage is lower than the battery voltage, turning off the second switching means when the difference between the module voltages is higher than the discharge-prohibiting voltage difference above which discharging of the rechargeable battery must be prohibited and the terminal voltage is lower than the battery voltage, and turning on the second switching means when the terminal voltage is higher than the battery voltage; and turning off the first and the second switching means when the battery temperature is outside a predetermined temperature region;

wherein the charge-prohibiting voltage and the discharge-prohibiting voltage difference are controlled depending on a function of the battery temperature.

In accordance with this fifth aspect of the present invention, the control means turns on the first and second switching means when the battery voltage is below a charge-prohibiting voltage, and when the voltage difference between a plurality of battery modules is below a predetermined value, so that the rechargeable battery can be charged and discharged when connected to the input/output terminals. When the battery voltage is above the charge-prohibiting voltage, the control means turns the first switching means off to stop charging of the rechargeable battery, but when a discharge state is detected, in which the terminal voltage is lower than the battery voltage, the control means turns the first switching means on to allow discharging of the rechargeable battery. Accordingly, even when the rechargeable battery is discharged under the control for preventing further charging, no large discharge current flows through the parasitic diode in the first switching means, because the first switching means has been turned on, whereby heat generation and resultant deterioration of the first switching means are prevented.

When the module voltage difference is above a predetermined discharge-prohibiting voltage difference, the control means turns the second switching means off to stop discharging of the rechargeable battery, because there is the possibility that some cells may be in a state of over-discharge. With this control, even when there are variations in the battery capacity between various cells connected in series that constitute the rechargeable battery, it is prevented that some cells fall into a state of over-discharge, whereby the battery performance of the rechargeable battery is prevented from deteriorating. During this control of prohibiting further discharge, when a charging state is detected by a comparison between the terminal voltage and the battery voltage, the control means turns the second switching means on to allow charging of the rechargeable battery.

The charge-prohibiting voltage and the discharge-prohibiting voltage difference are controlled depending on the changes in the battery temperature. When the battery temperature is outside a permissible range, the charge-prohibiting voltage and the discharge-prohibiting voltage difference are changed accordingly, and the control means effect control of stopping the first and the second switching means as required. Therefore, charging/discharging of the rechargeable battery under a condition in which the battery temperature is outside a permissible range is inhibited, whereby deterioration of the rechargeable battery can be prevented.

DESCRIPTION OF THE PREFERRED EMBODIMENTS

Preferred embodiments of the present invention will be hereinafter described with reference to the accompanying drawings. It should be understood that these embodiments are merely specific examples of the present invention and pose in no way a limitation on the technical scope of the invention.

Figure 1:
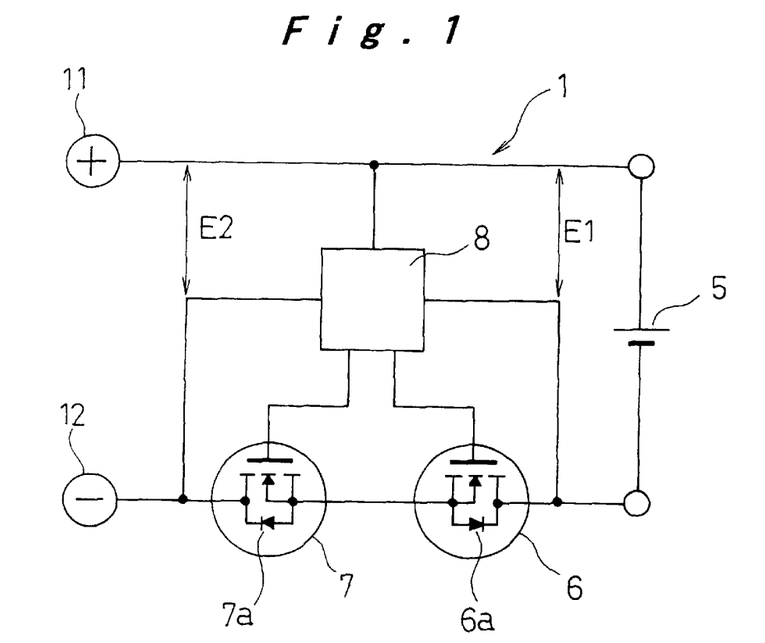
FIG. 1 is a circuit diagram showing the configuration of a battery protection device in accordance with a first embodiment of the present invention.

FIG. 1 shows the configuration of a battery protection device 1 in accordance with a first embodiment of the present invention, configured as a battery power source connected to a rechargeable battery 5 in the form of a lithium-ion rechargeable battery. When input/output terminals 11 and 12 are connected to a battery charger to charge the rechargeable battery 5 or when the rechargeable battery 5 is discharged by a battery-using appliance connected to the input/output terminals 11 and 12, the battery protection device 1 ensures that the rechargeable battery 5 is not overcharged or discharged.

The battery protection device 1 in FIG. 1 includes a first FET (first switching means) 6, a second FET (second switching means) 7, and a control circuit (control means) 8. This charge/discharge circuit is connected between the positive and negative electrodes of the rechargeable battery 5 on the one hand and the positive input/output terminal 11 and the negative input/output terminal 12 on the other hand. The positive electrode of the rechargeable battery 5 is connected directly to the positive input/output terminal 11 of the battery power source, whereas the negative electrode of the rechargeable battery 5 is connected to the negative input/output terminal 12 via the first FET 6 and the second FET 7. The first and second FETs 6 and 7 are configured as power MOSFETs having the parasitic diodes 6a and 7a. The first FET 6 is connected such that the forward direction of the parasitic diode 6a corresponds to the discharge direction of the rechargeable battery 5, whereas the second FET 7 is connected such that the forward direction of the parasitic diode 7a corresponds to the charge direction of the rechargeable battery 5. The first and second FETs 6 and 7 are controlled by control voltages that the control circuit 8 applies to the gates of the two FETs, thereby switching the connection between source and drain on (conducting) and off (not conducting).

The control circuit 8 detects the battery voltage E1 between the positive and negative electrodes of the rechargeable battery 5 and the terminal voltage E2 between the positive input/output terminal 11 and the negative input/output terminal 12, and depending on the battery voltage E1 and the terminal voltage E2, the control circuit 8 turns the first and second FETs 6 and 7 on or off.

When the battery voltage E1 is below the charge-prohibiting voltage above which charging of the rechargeable battery 5 is prohibited, the control circuit 8 turns the first FET 6 on. When the battery voltage E1 is above the discharge-prohibiting voltage below which discharging of the rechargeable battery 5 is prohibited, the control circuit 8 turns the second FET 7 on. In other words, under the appropriate charge/discharge conditions in which the battery voltage E1 is between the charge-prohibiting voltage and the discharge-prohibiting voltage, the first and the second FETs 6 and 7 are both turned on. With this control, the rechargeable battery 5 can both be charged and discharged, as the positive electrode and the negative electrode of the rechargeable battery 5 are connected to the input/output terminals 11 and 12 via the first and second FETs 6 and 7.

When the battery voltage E1 is above the charge-prohibiting voltage at which charging of the rechargeable battery 5 is prohibited, the control circuit 8 turns the first FET 6 off. The battery voltage E1 rises as the charging of the rechargeable battery 5 proceeds, and overcharging beyond full charge would lead to deterioration and eventually failure of the rechargeable battery 5. However, with the present invention, overcharging of the rechargeable battery 5 can be prevented by setting the charge-prohibiting voltage to an appropriate value.

When the first FET 6 is turned off to prevent overcharging, the forward direction of its parasitic diode 6a corresponds to the discharge direction, thereby enabling the discharging of the rechargeable battery 5. More specifically, when the rechargeable battery 5 has been charged with a battery charger connected to the input/output terminals 11 and 12, and the rechargeable battery 5 has reached the charge-prohibiting voltage at which the rechargeable battery 5 has been charged to full charge, the battery protection device 1 impedes further charging, so that when the input/output terminals 11 and 12 are connected to an appliance, the second FET 7 and the parasitic diode 6a of the first FET 6 form part of a discharge circuit, enabling discharge of the rechargeable battery 5. When, however, a large current flows as mentioned above, through the parasitic diode 6a during the discharge, the first FET 6 would possibly deteriorate due to heat generation. Therefore, when the control circuit 8 detects that the terminal voltage E2 is lower than the battery voltage E1, that is, when it detects a discharge situation, it turns the first FET 6 on. With this control, the discharge current does not flow through the parasitic diode 6a, so that deterioration due to heat generation by the first FET 6 can be prevented.

When the battery voltage E1 drops below the discharge-prohibiting voltage at which discharging of the rechargeable battery 5 is prohibited, the control circuit 8 turns the second FET 7 off. The battery voltage E1 drops as the discharging of the rechargeable battery 5 proceeds, and over-discharging, where the battery capacity approaches zero, would lead to deterioration of the rechargeable battery 5. However, with the present invention, over-discharging of the rechargeable battery 5 can be prevented by setting the discharge-prohibiting voltage to an appropriate value.

When the second FET 7 is turned off to prevent over-discharging, the forward direction of its parasitic diode 7a corresponds to the charge direction, thereby enabling the charging of the rechargeable battery 5. More specifically, as the discharging with the input/output terminals 11 and 12 being connected to a battery-using appliance proceeds, and when the discharge-prohibiting voltage is reached, the battery protection device 1 impedes further discharging, thereby making further use of the appliance impossible, so that when the input/output terminals 11 and 12 are connected to a battery charger, the first FET 6 and the parasitic diode 7a of the second FET 7 form part of a charge circuit, enabling the charging of the rechargeable battery 5. Charging of the rechargeable battery 5 through the parasitic diode 7a may deteriorate the second FET 7, similarly to the first FET 6 as mentioned above, due to heat generation.

Therefore, when the control circuit 8 detects that the terminal voltage E2 is higher than the battery voltage E1, that is, when it detects a charge situation, it turns the second FET 7 on. With this control, the charge current does not flow through the parasitic diode 7a, so that deterioration due to heat generation by the second FET 7 can be prevented.

Figure 2:
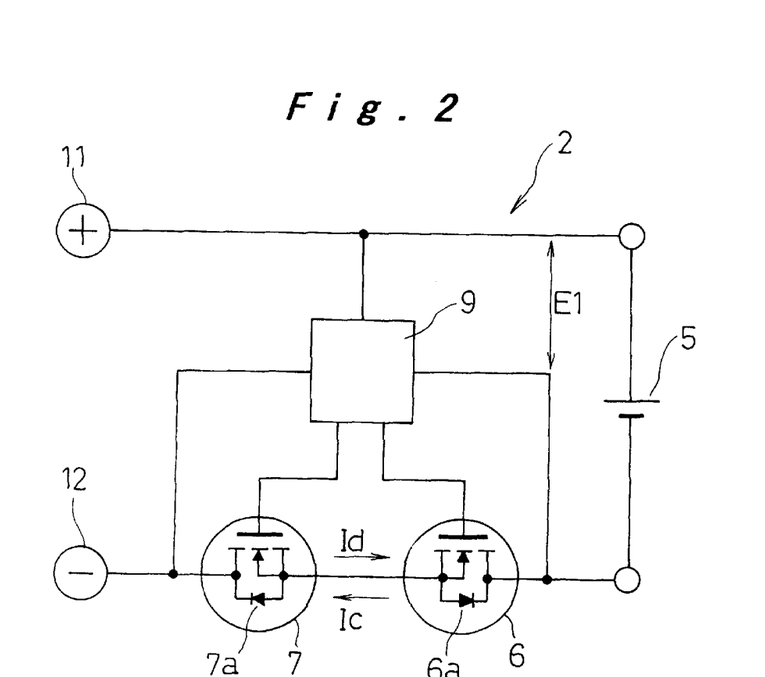
FIG. 2 is a circuit diagram showing the configuration of a battery protection device in accordance with a second embodiment of the present invention.
Figure 3:
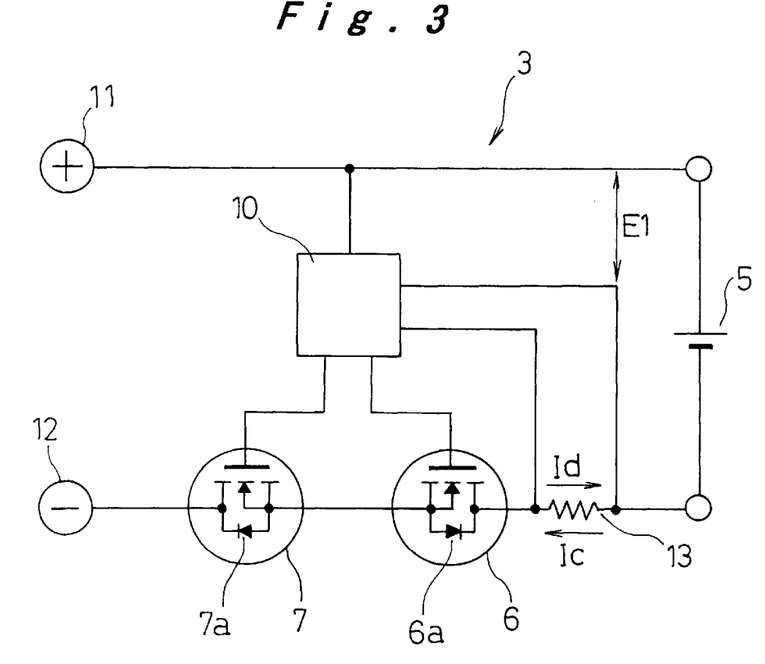
FIG. 3 is a circuit diagram showing the configuration of a battery protection device in accordance with a third embodiment of the present invention.

Next, a battery protection device 2 according to a second and a third embodiment of the present invention will be described. FIG. 2 shows the configuration of a battery protection device 2 in a second embodiment of the present invention, and FIG. 3 shows the configuration of a battery protection device 3 in a third embodiment of the present invention. Elements whose configuration corresponds to those in the first embodiment are denoted by the same numerals, and their further explanation will be omitted.

The control circuit 9 in FIG. 2 detects not only the battery voltage E1 between the positive and negative electrodes of the rechargeable battery 5, but also the direction of the currents flowing through the first and second FETs 6 and 7, which are connected in series as part of the charge/discharge circuit. The first and the second FETs 6 and 7 have small resistance values both in their ON and OFF states, and therefore, by detecting the direction of the voltage drop across the terminals of the serially-connected first and second FETs 6 and 7, it is possible to determine whether the current direction corresponds to a charge current Ic or to a discharge current Id. It is also possible to detect the direction of the voltage drop in the charge/discharge circuit by detecting the voltage across a resistor 13 connected in series in the charge/discharge circuit. The battery protection device 3 according to the third embodiment of the present invention adopts this configuration as shown in FIG. 3.

When the battery voltage E1 is below the charge-prohibiting voltage at which charging of the rechargeable battery 5 is prohibited and above the discharge-prohibiting voltage at which discharging of the rechargeable battery 5 is prohibited, in other words, when the battery voltage E1 is under appropriate charge/discharge conditions between the charge-prohibiting voltage and the discharge-prohibiting voltage, then the control circuit turns on both the first and the second FETs 6 and 7, regardless of the direction of the current. Thereby, the positive electrode and the negative electrode of the rechargeable battery 5 are connected to the input/output terminals 11 and 12 via the first and the second FET 6 and 7, and charging and discharging of the rechargeable battery 5 both become possible.

When the battery voltage E1 is above the charge-prohibiting voltage at which charging of the rechargeable battery 5 is prohibited, then the control circuit 9 turns the first FET 6 off. When the first FET 6 is turned off, the current direction is determined from the terminal voltages of the first FET 6 and the second FET 7, which are connected in series in the charge/discharge circuit. If the current direction corresponds to a discharge current Id, then the control circuit 9 turns the first FET 6 on, thereby stopping the discharging through the parasitic diode 6a of the first FET 6. With this control, the charge current does not flow through the parasitic diode 6a, and deterioration of the first FET 6 due to heat generation can be prevented.

Conversely, when the battery voltage E1 is below the discharge-prohibiting voltage at which discharging of the rechargeable battery 5 is prohibited, then the control circuit 9 turns the second FET 7 off. When the second FET 7 is turned off, the current direction is determined from the terminal voltages of the first FET 6 and the second FET 7, which are connected in series in the charge/discharge circuit. If the current direction corresponds to the charge current Ic, then the control circuit 9 turns the second FET 7 on, thereby stopping the charging through the parasitic diode 7a of the second FET 7. With this control, the charge current does not flow through the parasitic diode 7a, and deterioration of the second FET 7 due to heat generation can be prevented.

In the case of the battery protection device 3 shown in FIG. 3, the current direction is determined from the voltage across the resistor 13, and the same control is performed as with the battery protection device 2.

Figure 4:
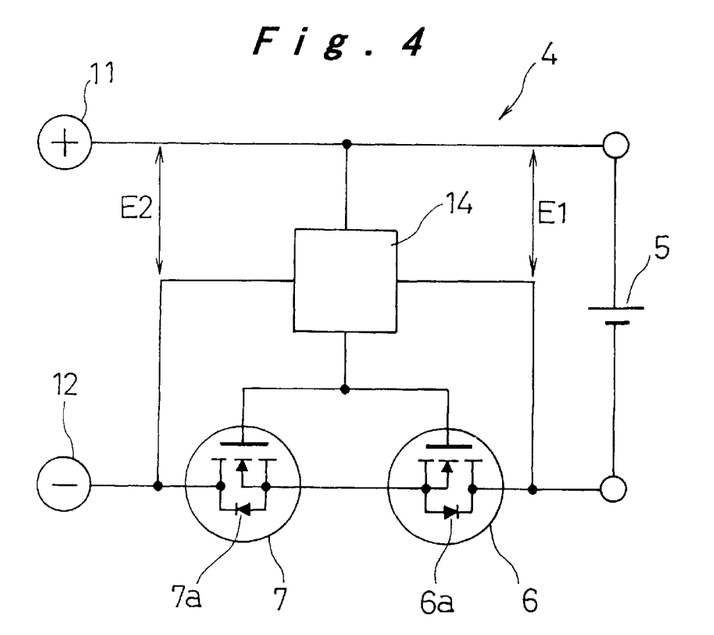
FIG. 4 is a circuit diagram showing the configuration of a battery protection device in accordance with a fourth embodiment of the present invention.

Next, a battery protection device 4 according to a fourth embodiment of the present invention will be described. FIG. 4 shows the configuration of the battery protection device 4 in the fourth embodiment. Elements whose configuration corresponds to those in the foregoing embodiments are denoted by the same numerals, and their further explanation will be omitted.

The control circuit (control means) 14 in FIG. 4 detects the battery voltage E1 between the positive and negative electrodes of the rechargeable battery 5, and the terminal voltage E2 between the input/output terminals 11 and 12. Depending on the detected battery voltage E1 and the terminal voltage E2, the first and the second FETs 6 and 7 are simultaneously turned on or off with a control signal.

Figure 5:
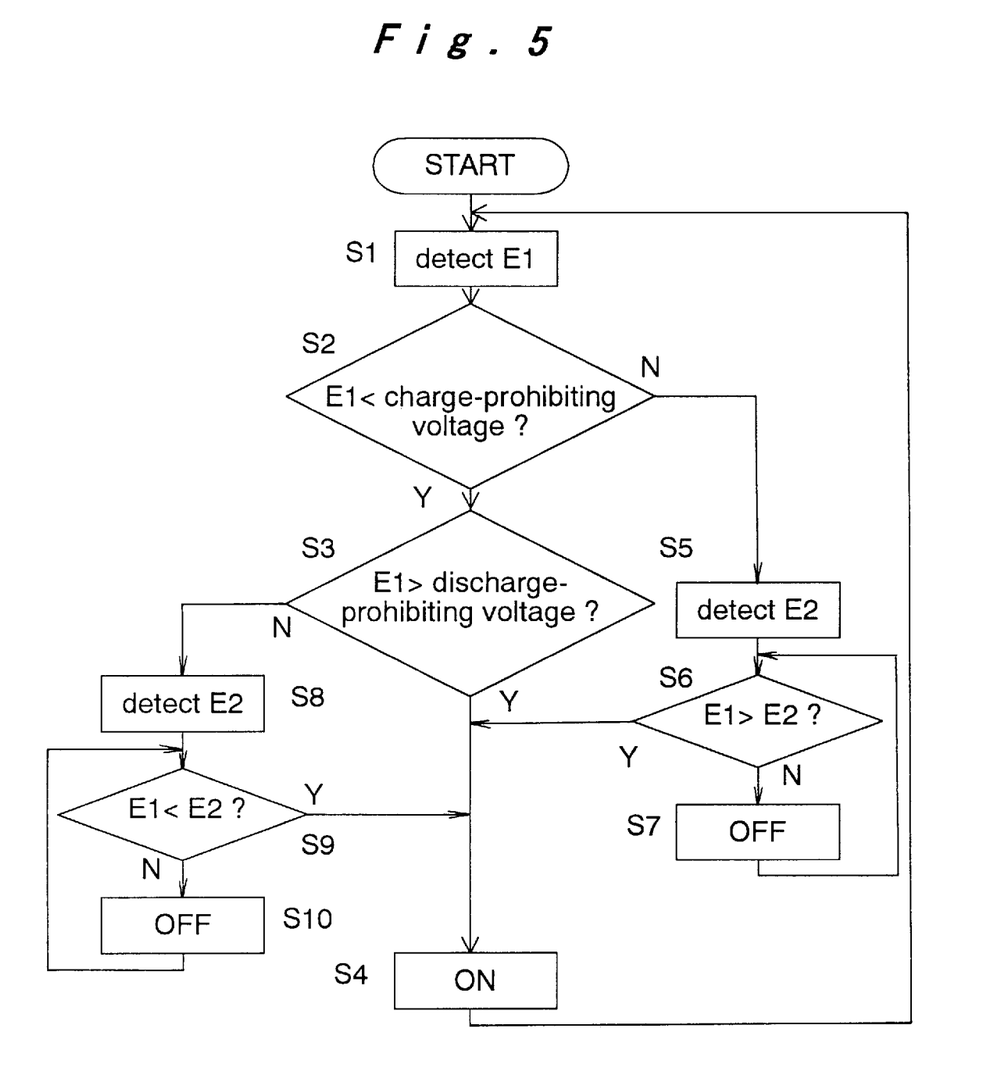
FIG. 5 is a flowchart illustrating the control operation in the fourth embodiment of the present invention.

FIG. 5 is a flowchart illustrating the control operation of the control circuit 14. Reference numerals S1, S2 etc. in FIG. 5 represent each process step of the operation control procedure.

First, the control circuit 14 detects the battery voltage E1 (S1), then it is checked whether the battery voltage E1 is lower than the charge-prohibiting voltage at which charging of the rechargeable battery 5 is prohibited (S2) and higher than the discharge-prohibiting voltage at which discharging of the rechargeable battery 5 is prohibited (S3), that is, whether the battery voltage E1 satisfies predetermined charge/discharge conditions between the charge-prohibiting voltage and the discharge-prohibiting voltage. If that is the case, then the control circuit 14 outputs an ON-control signal, which turns the first and the second FETs 6 and 7 on (S4). With this control, the positive electrode and the negative electrode of the rechargeable battery 5 are connected to the input/output terminals 11 and 12 via the first and the second FETs 6 and 7, thereby making both charging and discharging of the rechargeable battery 5 possible.

If the battery voltage E1 at step S2 is higher than the charge-prohibiting voltage, then the terminal voltage E2 is detected (S5), the battery voltage E1 is compared with the terminal voltage E2 (S6), and when a charge situation is detected, in which the terminal voltage E2 is higher than the battery voltage E1, then the control circuit 14 outputs an OFF-control signal, which turns the first and the second FETs 6 and 7 off (S7). With this control, the charge/discharge circuit is interrupted, thereby preventing overcharging of the rechargeable battery 5. The first and the second FETs 6 and 7 are kept turned off until either a discharge situation is detected in which the terminal voltage E2 is lower than the battery voltage E1, or the battery voltage E1 reaches a charge-permitting voltage, which is lower than the charge-prohibiting voltage.

While the first and the second FETs 6 and 7 are turned off, when the control circuit 14 detects a discharge situation, in which the terminal voltage E2 is lower than the battery voltage E1, then the output signal is switched to an ON-control signal, and the first and the second FETs 6 and 7 are turned on. As long as a charge situation is detected, in which the terminal voltage E2 is higher than the battery voltage E1, the first and the second FETs 6 and 7 are kept turned off.

If the battery voltage E1 in Step S3 is lower than the discharge-prohibiting voltage, the terminal voltage E2 is detected (S8), the battery voltage E1 is compared with the terminal voltage E2 (S9), and when a discharge situation is detected, in which the terminal voltage E2 is lower than the battery voltage E1, then the control circuit 14 outputs an OFF-control signal, which turns the first and the second FETs 6 and 7 off (S10). With this control, the charge/discharge circuit is interrupted, thereby preventing over-discharging of the rechargeable battery 5. The first and the second FETs 6 and 7 are kept turned off until either a charge situation is detected, in which the terminal voltage E2 is higher than the battery voltage E1, or the battery voltage E1 reaches a discharge-permitting voltage, which is higher than the discharge-prohibiting voltage.

While the first and the second FETs 6 and 7 are turned off, when the control circuit 14 detects a charge situation, in which the terminal voltage E2 is higher than the battery voltage E1, then the output signal is switched to an ON-control signal, and the first and the second FETs 6 and 7 are turned on, thereby enabling charging of the rechargeable battery 5. As long as a discharge situation is detected, in which the terminal voltage E2 is lower than the battery voltage E1, the first and the second FETs 6 and 7 are kept turned off.

With this configuration of the battery protection device 4, the control circuit 14 turns the first and the second FETs 6 and 7 simultaneously on or off, so that no current flows through the parasitic diodes 6a and 7a of the FETs 6 and 7, thereby preventing deterioration of the first and second FETs 6 and 7 due to heat generation caused by large currents flowing through the parasitic diodes 6a and 7a.

In the drawings of the above-described embodiments, the rechargeable battery 5 is shown as one battery. However, these embodiments can be equally applied to cases where two or more rechargeable batteries 5 are connected in parallel or in series.

Figure 7:
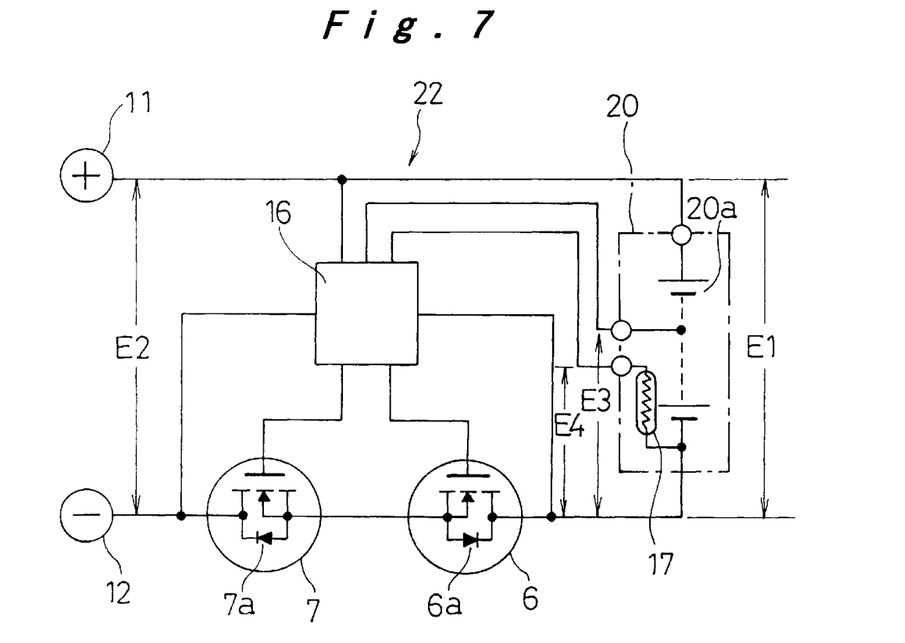
FIG. 7 is a circuit diagram showing the configuration of a battery protection device in accordance with a sixth embodiment of the present invention.
Figure 8:
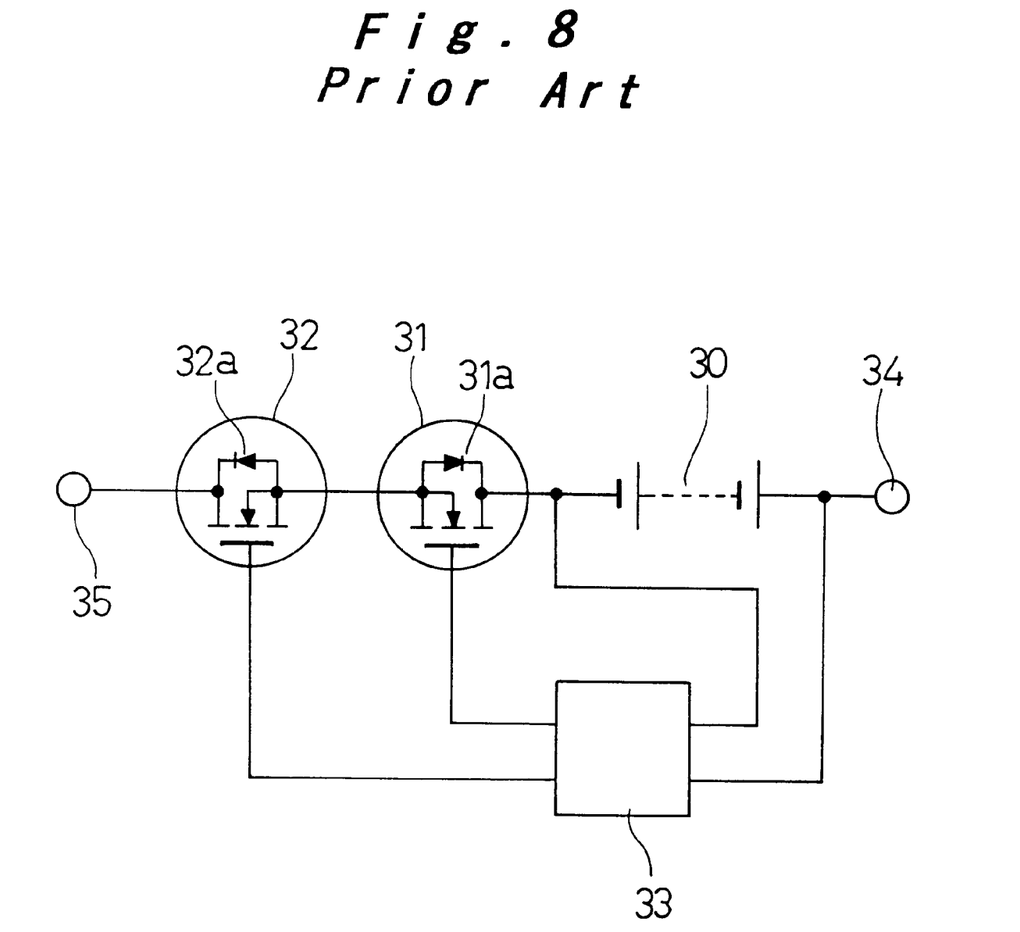
FIG. 8 is a circuit diagram showing the configuration of a conventional battery protection device.

FIGS. 6 and 7 respectively show a fifth and a sixth embodiment of the present invention, wherein a plurality of cells are connected in series.

The control circuit 15 detects the battery voltage E1 across the positive and negative electrodes of the rechargeable battery 5, the terminal voltage E2 between the positive input/output terminal 11 and the negative input/output terminal 12, and the intermediate voltage E3 between an intermediate cell 5a of the plurality of series-connected cells 5a and the negative electrode, and depending on the battery voltage E1, the terminal voltage E2, and the intermediate voltage E3, the control circuit 15 turns the first and second FETs 6 and 7 on or off.

When the battery voltage E1 is below the charge-prohibiting voltage above which charging of the rechargeable battery 5 must be prohibited (i.e. when the rechargeable battery 5 is under normal charging conditions), the control circuit 15 turns the first FET 6 on. When the battery voltage E1 becomes higher than the charge-prohibiting voltage, the control circuit 15 turns the first FET 6 off. The battery voltage E1 rises as the charging of the rechargeable battery 5 proceeds, and over-charging beyond full charge would lead to deterioration and eventually failure of the rechargeable battery 5. However, according to the present invention, over-charging of the rechargeable battery 5 can be prevented by setting the charge-prohibiting voltage to an appropriate value.

When the first FET 6 is turned off to prevent over-charging, the forward direction of its parasitic diode 6a corresponds to the discharge direction, thereby enabling the discharging of the rechargeable battery 5. More specifically, when the rechargeable battery 5 has been charged with a battery charger connected to the input/output terminals 11 and 12, and the rechargeable battery 5 has reached the charge-prohibiting voltage at which the rechargeable battery 5 has been charged to full charge, the battery protection device 21 impedes further charging, so that when the input/output terminals 11 and 12 are connected to an electric appliance, the second FET 7 and the parasitic diode 6a of the first FET 6 form part of a discharge circuit, enabling the discharge of the rechargeable battery 5. When, however, a large current flows, as mentioned above, through the parasitic diode 6a during the discharge, the first FET 6 would possibly deteriorate due to heat generation. Therefore, when the control circuit 15 in this embodiment detects that the terminal voltage E2 is lower than the battery voltage E1, that is, when it detects a discharge situation, it turns the first FET 6 on. Consequently, the discharge current does not flow through the parasitic diode 6a, so that deterioration due to heat generation by the first FET 6 can be prevented.

The plurality of cells 5a constituting the rechargeable battery 5 are divided into two battery modules by the intermediate cell, i.e., one battery module comprising a group of cells on the positive electrode side, and the other battery module comprising a group of cells on the negative electrode side. The battery module voltage on the positive electrode side can be obtained by subtracting the intermediate voltage E3 from the battery voltage E1 (E1−E3), and the battery module voltage on the negative electrode side is equal to the intermediate voltage E3. The control circuit 15 determines the voltage difference between these two battery modules from the battery voltage E1 of the rechargeable battery 5 and the intermediate voltage E3, and when the voltage difference (E1−E3)−(E3) between the two battery modules exceeds a certain value, the control circuit 15 turns the second FET 7 off, and stops the discharging of the rechargeable battery 5.

When the rechargeable battery 5 includes a plurality of cells 5a connected in series, an imbalance of the battery capacities of the cells 5a may occur because of variations in the battery capacities of the cells 5a, and because their deterioration due to repeated use has not proceeded uniformly. Thus, there is the danger that cells 5a with smaller battery capacity discharge faster and enter a state of over-discharge. Consequently, there is the possibility that over-discharging of the cells 5a cannot be detected from the battery voltage E1. According to the present invention, however, it is possible to detect an over-discharge from the voltage difference between the cells, because the voltage of the battery module on the side where the cells 5a have entered a state of over-discharge decreases. Therefore, it is possible to prevent deterioration of the cells 5a by stopping the discharge depending on the voltage difference between the battery modules as described above.

When the second FET 7 is turned off to prevent over-discharging, the forward direction of its parasitic diode 7a corresponds to the charge direction, thereby enabling the charging of the rechargeable battery 5. More specifically, as discharging by connecting a battery-using appliance to the input/output terminals 11 and 12 proceeds and the discharge-prohibiting voltage is reached, the battery protective device 1 impedes further discharging, thereby making further use of the appliance impossible, so that when the input/output terminals 11 and 12 are connected to a battery charger, the first FET 6 and the parasitic diode 7a of the second FET 7 form part of a charge circuit, enabling the charging of the rechargeable battery 5. Charging of the rechargeable battery 5 through the parasitic diode 7a, however, may deteriorate the second FET 7, due to heat generation as noted above. Therefore, when the control circuit 15 detects that the terminal voltage E2 is higher than the battery voltage E1, that is, when it detects a charge situation, it turns the second FET 7 on. Consequently, the charge current does not flow through the parasitic diode 7a, so that deterioration due to heat generation by the second FET 7 can be prevented.

Next, a battery protection device 22 according to a sixth embodiment of the present invention will be described. FIG. 7 shows the configuration of a battery protection device 22 in accordance with the sixth embodiment. Elements whose configuration corresponds to those in the foregoing embodiments are denoted by the same numerals, and their further explanation will be omitted.

In FIG. 7, the rechargeable battery 20 includes a plurality of cells 20a connected in series. The cells 20a are divided into two groups, one on the positive electrode side and the other on the negative electrode side, each of the two groups of cells 20a constituting a battery module. Similarly to the fifth embodiment, the battery protection device 22 detects the intermediate voltage E3 across an intermediate cell and the negative electrode. In addition, the rechargeable battery 20 includes a thermistor (temperature detection means) 17 for detecting the temperature of the rechargeable battery 20.

The control circuit 16 detects the battery voltage E1 between the positive and negative electrodes of the rechargeable battery 20, the terminal voltage E2 between the positive input/output terminal 11 and the negative input/output terminal 12, and the intermediate voltage E3 across an intermediate cell and the negative electrode. In addition, the battery protection device 22 detects the temperature of the rechargeable battery 20, which is determined from a temperature-indicating voltage E4 that changes in accordance with the resistance of the thermistor (temperature detection element) 17, which is proportional to its temperature. According to this embodiment, the control circuit 16 turns the first and second FETs 6 and 7 on or off depending on the battery voltage E1, the terminal voltage E2, the intermediate voltage E3, and the temperature-indicating voltage E4.

When the temperature-indicating voltage E4 exceeds a predetermined value, that is, when the temperature of the rechargeable battery 20 is in an appropriate temperature range, and the battery voltage E1 is below the charge-prohibiting voltage above which charging of the rechargeable battery 20 must be prohibited, the control circuit 16 turns the first FET 6 on, and when the temperature-indicating voltage E4 exceeds a predetermined value and the voltage difference (E1−E3)−(E3) between the two groups of cells determined from the battery voltage E1 and the intermediate voltage E3 is below a predetermined voltage difference, the control circuit 16 turns the second FET 7 on. That is, when the battery temperature is within a permissible range and appropriate charge conditions are satisfied, both of the first and the second FETs 6 and 7 are turned on. Consequently, the positive and negative electrodes of the rechargeable battery 20 are connected to the input/output terminals 11 and 12 via the first and second FETs 6 and 7, and charging and discharging of the rechargeable battery 20 both become possible.

When the battery voltage is below the charge-prohibiting voltage while the terminal voltage is higher than the battery voltage (i.e. in a charge situation), the first FET 6 is turned on. On the other hand, when the battery voltage is higher than the charge-prohibiting voltage while the terminal voltage is higher than the battery voltage (i.e. in a charge situation), the first FET 6 is turned off.

The charge-prohibiting voltage is changed depending on the temperature-indicating voltage E4. When the battery temperature is outside a predetermined temperature range, the charge-prohibiting voltage is changed accordingly. That is, when the battery temperature is outside an appropriate temperature range, this would lead to deterioration of the rechargeable battery 20 or to a decrease of the battery performance, and therefore, according to the present invention, when it is detected the battery temperature is outside a predetermined range, the charge-prohibiting voltage is changed in accordance with a function representative of the battery temperature, so that the first FET 6 is turned off.

The battery voltage E1 rises as the charging of the rechargeable battery 20 proceeds, and over-charging beyond full charge would lead to deterioration and eventually failure of the rechargeable battery 20. However, with the present invention, over-charging of the rechargeable battery 20 can be prevented by setting the charge-prohibiting voltage to an appropriate value.

While the first FET 6 is turned off to prohibit over-charging as described above, and the control circuit 16 has detected a discharge situation, in which the terminal voltage E2 is lower than the battery voltage, then the first FET 6 is turned on. Consequently, the discharge current does not flow through the parasitic diode 6a, so that deterioration of the first FET 6 due to heat generation can be prevented.

If the voltage difference between the module voltages of two battery modules is above a predetermined value, there is the possibility that some cells are in a state of over-discharge. Accordingly, when the voltage difference between the module voltages exceeds a predetermined discharge-prohibiting voltage difference above which discharging of the rechargeable battery 20 must be prohibited, the control circuit 9 turns the second FET 7 off. With this control, even when there are variations in the battery capacity between various cells connected in series, it is prevented that some cells fall into a state of over-discharge, whereby the battery performance of the rechargeable battery is prevented from deteriorating.

While the second FET 7 is turned off to prohibit over-discharging as described above, and the control circuit 16 has detected a charge situation, in which the terminal voltage E2 is higher than the battery voltage E1, then the second FET 7 is turned on, and charging is enabled.

The discharge-prohibiting voltage difference is changed depending on the temperature-indicating voltage E4. When the battery temperature is outside a predetermined temperature range, the discharge-prohibiting voltage difference is changed accordingly. That is, when the battery temperature is outside an appropriate temperature range, this would lead to deterioration of the rechargeable battery 20 or to a decrease of the battery performance, and therefore, according to the present invention, when it is detected that the battery temperature is outside a predetermined range, the discharge-prohibiting voltage difference is changed in accordance with a function representative of the battery temperature, so that the second FET 7 is turned off.

The rechargeable batteries 5 and 20 of the fifth and sixth embodiments described above have been explained as being constituted by a number of cells 5a or 20a connected in series. The present invention can similarly be applied in the case where a number of cells 5a or 10a are connected in parallel, and such groups of cells are connected in series.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery protection device incorporated in a rechargeable battery, comprising:

a first switching means and a second switching means connected in series in a charge/discharge circuit for connecting a positive electrode of the rechargeable battery to a positive input/output terminal and a negative electrode of the rechargeable battery to a negative input/output terminal; and a control means for detecting (i) a battery voltage between the positive electrode and the negative electrode of the rechargeable battery and (ii) a terminal voltage between the positive input/output terminal and the negative input/output terminal;

turning on the first switching means when the battery voltage is below a charge-prohibiting voltage above which charging of the rechargeable battery must be prohibited, and turning on the second switching means when the battery voltage is above a discharge-prohibiting voltage below which discharging of the rechargeable battery must be prohibited;

turning off the first switching means when the battery voltage is higher than the charge-prohibiting voltage and the terminal voltage is higher than the battery voltage, and turning on the first switching means when the battery voltage is higher than the charge-prohibiting voltage and the terminal voltage is lower than the battery voltage; and turning off the second switching means when the battery voltage is lower than the discharge-prohibiting voltage and the terminal voltage is lower than the battery voltage, and turning on the second switching means when the battery voltage is lower than the discharge-prohibiting voltage and the terminal voltage is higher than the battery voltage.

2. A battery protection device incorporated in a rechargeable battery, comprising:

a first switching means and a second switching means connected in series in a charge/discharge circuit connecting a positive electrode of the rechargeable battery to a positive input/output terminal and a negative electrode of the rechargeable battery to a negative input/output terminal; and a control means for detecting (i) a battery voltage between the positive electrode and the negative electrode of the rechargeable battery and (ii) a current direction in the charge/discharge circuit;

turning on the first switching means when the battery voltage is below a charge-prohibiting voltage above which charging of the rechargeable battery must be prohibited, and turning on the second switching means when the battery voltage is above a discharge-prohibiting voltage below which discharging of the rechargeable battery must be prohibited;

turning off the first switching means when the battery voltage is higher than the charge-prohibiting voltage and the current detection is that of a charge current, and turning on the first switching means when the battery voltage is higher than the charge-prohibiting voltage and the current direction is that of a discharge current; and turning off the second switching means when the battery voltage is lower than the discharge-prohibiting voltage and the current direction is that of a discharge current, and turning on the second switching means when the battery voltage is lower than the discharge-prohibiting voltage and the current direction is that of a charge current.

3. The battery protection device according to claim 2, wherein the current direction is detected from the voltage across one or both of the first switching means and the second switching means.

4. The battery protection device according to claim 2, wherein the current direction is detected from the voltage across a resistor connected in series to the charge/discharge circuit.

5. A battery protection device incorporated in a rechargeable battery, comprising:

a first switching means and a second switching means connected in series in a charge/discharge circuit connecting a positive electrode of the rechargeable battery to a positive input/output terminal and a negative electrode of the rechargeable battery to a negative input/output terminal; and a control means for detecting (i) a battery voltage between the positive electrode and the negative electrode of the rechargeable battery and (ii) a terminal voltage between the positive input/output terminal and the negative input/output terminal;

turning on the first switching means when the battery voltage is below a charge-prohibiting voltage above which charging of the rechargeable battery must be prohibited, and turning on the second switching means when the battery voltage is above a discharge-prohibiting voltage below which discharging of the rechargeable battery must be prohibited;

turning off the first switching means and the second switching means when the battery voltage is higher than the charge-prohibiting voltage and the terminal voltage is higher than the battery voltage, and turning on the first switching means and the second switching means when the battery voltage is higher than the charge-prohibiting voltage and the terminal voltage is lower than the battery voltage; and turning off the first switching means and the second switching means when the battery voltage is lower than the discharge-prohibiting voltage and the terminal voltage is lower than the battery voltage, and turning on the first switching means and the second switching means when the battery voltage is lower than the discharge-prohibiting voltage and the terminal voltage is higher than the battery voltage.

6. A battery protection device incorporated in a rechargeable battery comprising a plurality of cells connected in series, comprising:

a first switching means and a second switching means connected in series in a charge/discharge circuit for connecting a positive electrode of the rechargeable battery to a positive input/output terminal and a negative electrode of the rechargeable battery to a negative input/output terminal; and a control means for detecting (i) a battery voltage between the positive electrode and the negative electrode of the rechargeable battery, (ii) module voltages of battery modules into which the plurality of cells constituting the rechargeable battery are divided in equal numbers, and (iii) a terminal voltage between the positive input/output terminal and the negative input/output terminal;

turning on the first switching means when the battery voltage is below a charge-prohibiting voltage above which charging of the rechargeable battery must be prohibited, and turning on the second switching means when the difference between the module voltages is below a certain voltage difference;

turning off the first switching means when the battery voltage is higher than the charge-prohibiting voltage and the terminal voltage is higher than the battery voltage, and turning on the first switching means when the battery voltage is higher than the charge-prohibiting voltage and the terminal voltage is lower than the battery voltage; and turning off the second switching means when the terminal voltage is lower than the battery voltage and the difference between the module voltages is above a certain voltage difference, and turning on the second switching means when the terminal voltage is higher than the battery voltage and the difference between the module voltages is above a certain voltage difference.

7. A battery protection device incorporated in a rechargeable battery comprising a plurality of cells connected in series, comprising:

a first switching means and a second switching means connected in series in a charge/discharge circuit for connecting a positive electrode of the rechargeable battery to a positive input/output terminal and a negative electrode of the rechargeable battery to a negative input/output terminal;

a temperature detection means for detecting the temperature of the rechargeable battery; and a control means for
detecting (i) a battery voltage between the positive electrode and the negative electrode of the rechargeable battery, (ii) module voltages of battery modules into which the plurality of cells constituting the rechargeable battery are divided in equal numbers, and (iii) a terminal voltage between the positive input/output terminal and the negative input/output terminal;

turning on the first switching means when the battery voltage is below a charge-prohibiting voltage above which charging of the rechargeable battery must be prohibited and the terminal voltage is higher than the battery voltage, turning off the first switching means when the battery voltage is higher than the charge-prohibiting voltage and the terminal voltage is higher than the battery voltage, and turning on the first switching means when the terminal voltage is lower than the battery voltage;

turning on the second switching means when a difference between the module voltages is below a discharge-prohibiting voltage difference above which discharging of the rechargeable battery must be prohibited and the terminal voltage is lower than the battery voltage, turning off the second switching means when the difference between the module voltages is higher than said discharge-prohibiting voltage difference and the terminal voltage is lower than the battery voltage, and turning on the second switching means when the terminal voltage is higher than the battery voltage; and turning off the first and the second switching means when the battery temperature is outside a predetermined temperature region;

wherein the charge-prohibiting voltage and the discharge-prohibiting voltage difference are controlled depending on a function representative of the battery temperature.

* * * * *